United States Patent [19]

Olander

[11] 4,287,321

[45] Sep. 1, 1981

[54] POLY(PHENYLENE ETHER)POLY(VINYL AROMATIC) COMPOSITIONS

[75] Inventor: Walter K. Olander, Mount Vernon, Ind.

[73] Assignee: General Electric Company, Pittsfield, Mass.

[21] Appl. No.: 102,280

[22] Filed: Dec. 10, 1979

[51] Int. Cl.$^3$ .................... C08G 65/40; C08G 65/44
[52] U.S. Cl. .................................. 525/392; 528/86; 528/205
[58] Field of Search .................. 525/392; 528/86, 205

[56] References Cited

U.S. PATENT DOCUMENTS

| | | | |
|---|---|---|---|
| 3,383,435 | 5/1968 | Cizek | 525/132 |
| 3,700,750 | 10/1972 | Yamanouchi et al. | 260/45.85 E |
| 3,781,382 | 12/1973 | Izawa et al. | 525/392 |
| 3,956,242 | 5/1976 | Olander | 528/215 |
| 4,075,174 | 2/1978 | Olander | 528/215 |
| 4,207,406 | 6/1980 | Olander | 525/392 |

Primary Examiner—Maurice J. Welsh
Attorney, Agent, or Firm—Morgan, Finnegan, Pine, Foley & Lee

[57] ABSTRACT

Polyphenylene ether-poly(vinyl aromatic) compositions are prepared by oxidatively coupling a phenol dissolved in a basic reaction medium comprising a vinyl aromatic compound in the presence of a manganese chelate catalyst, selectively liquid-liquid extracting base-reactive by-products, then thermally polymerizing the vinyl aromatic compound.

12 Claims, No Drawings

POLY(PHENYLENE ETHER)POLY(VINYL AROMATIC) COMPOSITIONS

This invention relates to a process for preparing compositions comprising a polyphenylene ether and a poly(vinyl aromatic), e.g., polystyrene. More particularly, it is concerned with an improved process for oxidatively coupling a phenol in solution in a vinyl aromatic compound with a manganese chelate catalyst, and thereafter polymerizing the vinyl aromatic compound.

BACKGROUND OF THE INVENTION

It is known to prepare compositions comprising polyphenylene ethers and poly(vinyl aromatic) compounds, e.g., polystyrene. These are useful per se as molding resins, see, e.g., Cizek, U.S. Pat. No. 3,383,435. In Sumitomo, German Pat. No. 1,939,033, pre-isolated polyphenylene ether, styrene and xylene are suspended in water and the styrene is polymerized using a free-radical initiator. In Bennett, Copper and Katchman, U.S. Pat. No. 4,152,369, polyphenylene ether is prepared in styrene using a copper-amine catalyst or a lead oxide catalyst, then the styrene is polymerized by bulk or emulsion techniques. Typically long reaction times are required. In Yamanouchi et al., U.S. Pat. No. 3,700,750, the suggestion is made to graft polyphenylene ether onto crystal homopolystyrene. In applicant's earlier issued U.S. Pat. No. 3,956,242 (and related patents), it is suggested to employ a manganese chelate catalyst for the oxidative coupling of a phenolic compound to a polyphenylene ether in a basic reaction medium. The polymer is then removed from solution by adding an antisolvent. The foregoing patents are all incorporated herein by reference.

The practical combination of a polyphenylene ether and a poly(vinyl aromatic) compound by the foregoing process has until now been stymied by slow vinyl aromatic conversions and the resultant low molecular weight of the polymers obtained from using the polyphenylene ether reaction mixtures directly, because of the by-product contaminants present. In spite of this, it is obviously desirable to use as the reactant for vinyl aromatic polymerization, an unisolated product of a polyphenylene ether polymerization. This is because anti-solvent isolation of polyphenylene ether from a conventional polymerization and solution in vinyl aromatic, e.g., styrene, is economically unattractive. Moreover, with copper-amine catalysts, in order to remove and recycle the amine portion of the catalyst, an acid extraction is traditional. It has now been found that a manganese chelate catalyst can be substituted and left in the polymer reaction solution and a selective liquid-liquid extraction of base included as a separate step. The extraction removes base-reactive by-products and low molecular weight polymers, nonpolymerizable monomer impurities, and colored species, all of which are left behind in conventional acetic acid extraction. The consequence of such base-reactive, non-acid-extractable residues being left in the polyphenylene ether solution is to interfere with subsequent polymerization of the vinyl aromatic, lowering its molecular weight and conversion rate.

The catalyst used in the present process is the manganese chelate system described in the above-mentioned U.S. Pat. No. 3,956,242. The system is capable of giving low by-product quantities of diphenoquinones (DQ when starting with 2,6-xylenol). Furthermore, when styrene is substituted for the more conventional toluene as a polymerization solvent, this catalyst system appears to generate even less base-reactive by-products. Because the preferred manganese (benzoin oxime)$_2$ system is very efficient and operates at low manganese levels, catalyst entrainment is possible without adverse effect on the final product. Indeed, it is a most unexpected advantage of the present process to be able to leave the polyphenylene oxide polymerization catalyst in the polyphenylene oxide-vinyl aromatic composition, and that such action does not seriously harm the product performance characteristics.

DESCRIPTION OF THE INVENTION

According to the present invention, there is provided a process for the preparation of a composition comprising a polyphenylene ether and a poly(vinyl aromatic) compound, said process comprising the steps of:

(a) oxidatively coupling a phenolic monomer to form a polyphenylene ether in a basic reaction medium comprising a polymerizable vinyl aromatic compound in the presence of a manganese chelate complex of the formula

wherein L is a ligand derived from an ω-hydroxyoxime by conventional means, Mn is the transition metal manganese and x is at least equal to about 0.05;

(b) selectively liquid-liquid extracting from the reaction mixture of step (a) with an immiscible solvent to the base-reactive by-products therein; and (c) thereafter heating the base-extracted solution of polyphenylene ether in vinyl aromatic compound under polymerization conditions until at least part of said vinyl aromatic compound has been polymerized.

The phenolic monomer is selected from compounds having the formula:

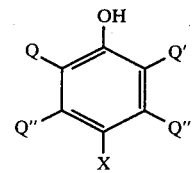

wherein X is a substituent selected from the group consisting of hydrogen, chlorine, bromine and iodine, Q is a monovalent substituent selected from the group consisting of hydrocarbon radicals, halohydrocarbon radicals having at least two carbon atoms between the halogen atom and the phenol nucleus, hydrocarbonoxy and halohydrocarbonoxy radicals having at least two carbon atoms between the halogen atom and the phenol nucleus; and Q' is as defined for Q and in addition may be halogen and Q" are each as defined for Q and in addition may be halogen and Q" are each as defined for Q' and in addition hydrogen, with the proviso that Q,Q' and Q" are all free of tertiary carbon atoms.

The ligand that is used to form the manganese (II) chelate complex or the manganese (VII) chelate complex is of the formula:

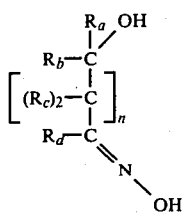

Formula I wherein $R_a$, $R_b$, $R_c$ and $R_d$ are selected from the group consisting of hydrogen, acyclic and cyclic organic radicals and n is a positive integer equal to 0 or 1. As used generally hereinafter, reference to manganese (II) chelate will be understood to be applicable to manganese (VII) chelates unless a specific manganese compound is designated.

The manganese (II) chelates can be employed in a mono, bis, tris, tetrakis, etc., ligand form wherein, one, two, three, four, etc., bidentate ligands, i.e., bidentate ligand being defined as the cyclic ring structure which arises from the union of a manganese (II) atom with a single oxime nitrogen atom and a single hydroxy oxygen atom associated with a single ω-hydroxyoxime ligand forming molecule, are associated with a single Mn (II) atom. Often manganese (II) chelates, preferably, are employed in their bis-bidentate form wherein two cyclic ring structures arise from the union of a single Mn (II) atom with two separate and distinct ω-hydroxyoxime molecules. Illustrative of Mn (II) chelates in mono-bidentate and bis-bidentate form are the chelates described by Formulas II and III, respectively, set out hereinafter.

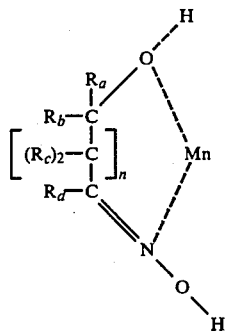

Formula II

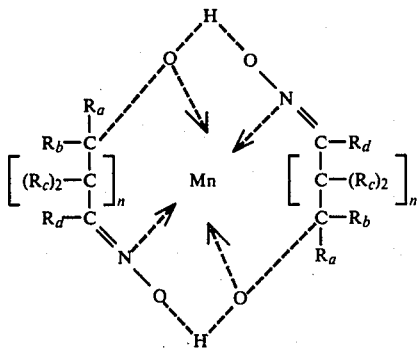

Formula III wherein $R_a$, $R_b$, $R_c$, $R_d$ and n are the same as defined hereinbefore.

The manganese (II) chelates can be prepared by any method known to those skilled in the art which introduces a divalent manganese ion, commonly referred to as Mn (II) or an Mn++, to a hydroxyoxime ligand group, i.e., any appropriate hydroxaldoxime or ketoxime of the Formula I, or any mixture thereof. In general, any amount of manganese (II) and ω-hydroxyoxime can be combined in the preparation of the Mn (II) chelate, however, an amount sufficient to form a Mn (II) bis-bidentate ligand chelate ring type is preferably employed. The aforesaid aldoxime or ketoxime reactants can be prepared by any method well known to those skilled in the art, such as by the well known reactions of a hydroxylamine with α- or β-hydroxy-substituted aldehyde or ketone, respectively, or by the use of suitable oxime exchange techniques, such as those described in U.S. Pat. No. 3,124,613. In the preparation of the effective Mn (II) chelate, a manganese (II) ion associated with ω-hydroxyoxime donor ligand atoms can be derived from any manganese (II) compound which is at least partially dispersible or soluble in an ω-hydroxyoxime solution. Representative manganese (II) compounds include manganese (II) halides such as manganese (II) chloride (also known as manganous chloride), manganese (II) bromide, manganese (II) iodide, etc., as well as other manganese (II) compounds, such as manganese (II) carbonate, manganese (II) oxalate, manganese (II) sulfate, manganese (II) acetate, manganese (II) nitrate, manganese (II) phosphate, etc., including hydrated forms of such Mn (II) compounds. A preferred manganese (VII) compound is potassium permanganate.

A preferred method of preparing manganese (II) ω-hydroxyoxime chelates comprises the formation of a solution of a manganese (II) compound and a ligand forming hydroxyoxime molecule in a suitable solvent, such as methanol or a combination of methanol and an organic solvent such as chlorobenzene, toluene, and xylene, etc., or mixtures thereof.

The possibility of formation of multiple rings, i.e., five- or six-membered chelate rings closely associated with hydrogen bonding is believed—especially with the five-membered chelate rings—to markedly increase the stability and effectiveness of Mn (II) chelates in promoting the condensation of a phenol to a polyphenylene oxide.

The $R_a$, $R_b$, $R_c$ and $R_d$ substituents attached to the chelate ring carbon atoms of the mangnaese (II) ω-hydroxyoxime catalyst—other than hydrogen—can be any acyclic or cyclic organic radical, e.g., alkyl, cycloalkyl, aryl, aralkyl, alkaryl, alkcycloalkyl, cycloalkaryl radicals or combinations thereof, etc., including acyclic and cyclic radicals having electron-releasing constituents, such as amine, i.e., $NH_2$; monoalkylamine, i.e., $NHR^1$, dialkylamine, i.e., $N(R^1)_2$; hydroxy, i.e., OH; alkoxy, i.e., $OR^1$, and alkanoate, i.e., $OOCR^1$, $R^1$ in all cases being an alkyl group. Preferably, the $R_a$, $R_b$, $R_c$ and $R_d$ substituents associated with each five- or six-membered chelate ring is selected from acyclic and cyclic hydrocarbon radicals, more preferably at least one of the $R_b$ or $R_d$ substituents is selected from aromatic radicals, and even more preferably both of the $R_b$ and $R_d$ substituents are selected from aromatic radicals. Preferably, the acyclic and cyclic hydrocarbon radicals contain from 1 to about 30 carbon atoms. Representative of preferred hydrocarbon radicals are the following: methyl, ethyl, propyl, butyl, cyclobutyl, pentyl, cyclohexyl, cycloheptyl, decyl, eicosyl, triacontyl, phenyl, benzyl, methylbenzyl, α-methylbenzyl, methylphenyl, diphenylmethyl, naphthylxylxy, etc.

Representative of ω-hydroxyoxime ligand forming molecules that can be employed to prepare the Mn (II) chelates are the following compounds; benzoin oxime, anisoin oxime, paradimethylaminobenzoin oxime, furoin oxime, acetoin oxime, 2-methyl-2-hydroxy-butan-3-one oxime (also known as methylhydroxybutanone oxime), ω-hydroxyacetophenone oxime, 2-methyl-2-hydroxy4-pentanone oxime, 2-phenyl-2-hydroxy-butan-3-one oxime (also known as phenylhydroxybutanone oxime), adipoin oxime, etc.

Any conventional polymerizable vinyl aromatic compound can be employed, see, e.g., the above-mentioned U.S. Pat. No. 4,152,369. Typical are styrene, α-methyl styrene, chlorostyrene, ethyl vinyl benzene, vinyl toluene, vinyl naphthalene, and the like. Preferred are styrene and vinyl toluene.

The relative proportions of phenol to vinyl aromatic compound can vary widely. Generally, acceptable economic reaction parameters comprise a mole proportion of phenol:vinyl aromatic within the range of from about 20:80 to about 5:95.

In order to carry out the Mn (II) chelate promoted self-condensation of phenol to polyphenylene oxide the self-condensation reaction must be carried out in a basic reaction medium, such as that provided by the presence of a strong alkali metal base, e.g., alkali metal hydroxides, alkali metal alkoxides, etc., or mixtures thereof. Commercially available alkali metal bases which are readily attainable are presently preferred, such as sodium hydroxide, potassium hydroxide, lithium hydroxide, sodium methoxide, etc. Currently, it is preferred that anhydrous sodium hydroxide be employed to provide the strong basic reaction environment essential to the polymerization reaction, however, aqueous solutions, e.g., 50 percent, sodium hydroxide can be employed for conveninece. The quantity of alkali metal base which is essential to the promotion of the self-condensation reaction can readily be determined without undue experimentation by those skilled in the art. In general, however, suitable phenol:alkali metal base mole ratios are within the range of from about 1:1 to 100:1, preferably from about 40:1 to about 5:1, and even more preferably from about 20:1 to about 10:1. In the preparation of polyphenylene oxide from 2,6-xylenol, optimum overall process reaction conditions, generally, establish the desirability of employing a 2,6-xylenol:alkali metal hydroxide mole ratio within the range of from about 14:1 to about 18:1.

In general, the mole proportions of phenol:Mn (II) chelate can vary widely to provide any desired—including minimum, maximum or optimum—degree of promotion of the reaction rate of phenols to polyphenylene oxide. Although not wishing to limit this invention by any theory, it is believed that the Mn (II) chelate reaction promoter functions as a true catalyst which remains essentially unconsumed or unchanged, e.g., a Mn (II) compound which is neither hydrolyzed nor dissociated due to thermal or other effects into a noncatalytic form during the self-condensation process. Apparently, the reason that the Mn (II) chelate behaves as a true catalyst is due to the unexpected stability of the Mn (II) five- or six-membered ω-hydroxyoxime chelate rings during preparation of the polyphenylene oxides.

It has been found that the Mn (II) chelate catalyst can be employed in very small amounts relative to the amount of phenol reactant while maintaining and often improving the rate of formation of a polyphenylene oxide compared to the rates of polyphenylene oxide formation associated with prior art processes. In general, however, subject to variations in accordance with the type of ω-hydroxyoxime ligand associated with the Mn (II) chelate, reaction rates comparable to those of the prior art can be obtained wherein the phenol to Mn (II) chelate mole ratio is within the range of from as low as about 100:1 to as high as about 3000:1, or even as high as about 6000:1. When the reaction is carried out under superatmospheric pressure, a pressure of for example 1 to 40 psig or 1 to 1000 psig may be employed.

In general, it is preferred that minimum quantities of Mn (II) chelate be employed for economic reasons and to provide a polyphenylene oxide containing a minimum amount of the maganese catalyst residue. Accordingly, it is preferred that the initial reaction media mole ratio of phenol:manganese (II) to be at least about 500:1, more preferably at least 1500:1, and even more preferably at least 3000:1, wherein the process is carried out at subatmospheric pressures.

As used herein and in the appended claims wherein phenol:manganese (II) numerical ratios are described, it is to be understood that the numerical proportions describe the number of moles of phenol relative to the number of atoms of manganese (II) associated with the Mn (II) chelate independent of the chelate form, i.e., mono-bidentate, bis-bidentate, etc.

In general, the reaction temperature employed in the preparation of polyphenylene oxide in the presence of the Mn (II) chelate catalyst can be varied widely. Suitable polymerization temperatures generally fall within the range of from about 0° to about 50° C., preferably within the range of from about 10° to about 40° C., and more preferably within the range of from about 20° C. to 30° C., since generally optimum self-condensation reaction rates have been found to exist within the 20° C. to 30° C. temperature range. Mn (II) chelates having strong electronreleasing constituents, e.g., dialkylamino radicals attached to $R_a$, $R_b$, $R_c$, $R_d$ aromatic substituent of Formulas II or III promote optimum reaction rates at temperatures at or above 35° C. Because the self-condensation reactions are exothermic in nature and the Mn (II) chelates are susceptible to thermal deactivation, it is generally desirable to program the addition of the majority of the phenolic monomeric reactant, and in some instances the Mn (II) chelate catalyst, during their initial contact within the reaction media. This programmed addition permits a suitable reaction temperature profile to be obtained whereby the reaction is maintained within a temperature range suited to optimum catalyst efficiency and optimum yields of polyphenylene oxide resin. In addition, more latitude with regard to the upper limits of the reaction temperature range can be obtained wherein the process is carried out at superatmospheric pressures, e.g., 1 to 40 psig, 1 to 1000 psig, or even higher pressures. In the event that the self-condensation reaction is discontinued or interrupted due to deactivation of the Mn (II) chelate at elevated temperatures, the reaction can be resumed in a normal fashion by reducing the temperatures of reaction medium and adding thereto additional manganese (II) chelate catalyst in the amounts required to initiate and maintain the desired catalyst efficiency.

A secondary aliphatic amine, e.g., di-n-butylamine, usually 1.0–1.5 weight percent of the phenol is employed to improve impact properties of the ultimate compositions, see U.S. Pat. No. 4,075,174.

The polymerization reaction is carried out by passing a stream of oxygen into the reactor at ambient temperatures at a rate that is adequate to provide sufficient oxygen to be in excess over that which is absorbed while vigorously stirring the solution. The manganese chelate catalyst solution is then added to the phenolic monomer solution. A 50% aqueous sodium hydroxide solution taken up in methanol is added to the reactor in an amount which is equal to about 16:1 of the phenol.

After initiation of the polymerization reaction, the reaction is regulated by the rate of addition of the second phenol reactant portion from the pump reservoir to the reactor in order to provide a controllable exotherm so that the temperature does not exceed substantially 45° C.

At the end of the reaction, the intrinsic viscosity of the simple of the polyphenylene ether should be about 0.50 when measured in chloroform at 25° C.

Sufficient water or brine is then added to allow separation of an aqueous heavy phase. Any alcohol in the reaction mixture will pass into this phase as will soluble basereactive by-products. Phase transfer agents, such as quarternary ammonium compounds, e.g., Aliquat 336 at 100 ppm based on vinyl aromatic may be added to enhance phase separation. Illustratively, the methane/water composition prior to separation is about 32/68 respectively. Ethylene glycol or a similarly dense methanol-water soluble compound can be added to increase the heavy phase density. Conventional techniques, such as centrifugation, e.g., using a Westphalia liquid-liquid centrifuge, can be used to separate the mixture into an organic polymer phase and an immiscible, e.g., aqueous/methanol phase. The latter phase has, in general a pH of 13.5–13.7, due to the strong base, e.g., NaOH, added initially to the polymerization. This is why low molecular weight polymer, phenolic residues and non-polymerizable monomers are solubilized for removal.

After separation of the heavier phase, the mixture is ideally suited for bulk thermal polymerization of the vinyl aromatic, in a fast reaction, with no need for a catalyst. Although the present process does not require suspension techniques, it is, of course, adaptable to them.

The polymerization of the vinyl aromatic compound is conveniently carried out as follows: The centrifuge light phase from step (b) is transferred to a suitable agitated reactor capable of being heated to about 130° C. Degassing with nitrogen is accomplished by holding the solution at about 50° C. for up to 30 minutes. Steam, applied to an internal loop, is used to bring the reaction temperature up to 105° C. Some water (and methanol) azeotrope is collected in a Dean Stark trap mounted on a top reactor port. Optionally, at this point an acid, acid chloride or acid anhydride is added to neutralize any trace base which might be present. Acetic acid, acetyl chloride or acetic anhydride are suitable for this purpose, acetic anhdyride being preferred.

The reaction mixture is rapidly brought to 125° C. Constant temperature devices are used to maintain the temperature at 124°–126° C. An inert nitrogen atmosphere can be maintained by bleeding nitrogen into the reactor. Reaction progress can be monitored, e.g., by following the increase in reaction solids, e.g., on an Ohaus evaporative balance, spectroscopically, or by other conventional means.

Although the polyphenylene ether moderates the vinyl aromatic conversion rate and molecular weight in comparison with that obtained in homopolymerization, none-the-less, the conversion rates are acceptable (>8% per hour) and the molecular weights are of commercial quality, as will be seen hereinafter.

The products can be isolated at any stage by adding an anti-solvent, e.g., methanol, or by using a total isolation technique, e.g., spray drying, devolatilizing extruder or steam stripping (crumbing).

DESCRIPTION OF THE PREFERRED EMBODIMENTS

The following examples illustrate the process of the present invention. The claims are not to be limited thereto.

EXAMPLE 1

(a) Preparation of a Liquid-Liquid Extracted Solution of Poly(2,6-dimethyl-1,4-phenylene)ether in Styrene A eight gallon polymerization employs the following reagents

|  | Weight | % | Moles |
|---|---|---|---|
| Ingredients |  |  |  |
| 2,6-xylenol | 9.41 lbs. | 16 | 35.02 |
| Methanol | 7.05 lbs. | 12 |  |
| Styrene | 42.35 lbs. | 72 |  |
| Di-n-butylamine | 0.094 lbs. |  |  |
| 50% aqueous NaOH | 0.375 lbs. |  |  |
| Catalyst |  |  |  |
| Mn Cl$_2$ | 3.63 g. |  | 0.028 |
| Benzoin oxime | 13.38 g. |  | 0.056 |
| Phase separation agent |  |  |  |
| Aliquot 336 | 5.0 g. |  |  |

The procedure follows U.S. Pat. No. 3,956,242. To the reactor is charged 15% of the 2,6-xylenol (as a 53.07% solution in styrene), most of the methanol and styrene and aqueous sodium hydroxide. An oxygen flow of 50 standard cubic feet per hour is initiated and catalyst, dissolved in 2000 ml. of methanol is added. At the same time, the remaining monomer and di-n-butylamine in styrene (53.07 wt. %) is added uniformly over the next 33 minutes. The temperature is maintained at 82° F. to a total of 100 minutes. An I.V. of a polymer sample is 0.51 dl./g. The reaction mixture is then heated to 135° F., the Aliquot 336, 6000 ml. of water and 2 gal. of styrene are added and the entire batch is processed through a liquid-liquid centrifuge, the desired material being collected as a centrifuge light phase. It has a density of 0.971 g./ml. and a pH of 13.7. For comparison purposes, after 4.5 gal. of light phase is collected, 115 ml. of glacial acetic acid is added to the remaining uncentrifuged reaction mixture.

(b) Thermal Polymerization of Styrene Containing Poly(2,6-dimethyl-1,4-phenylene)ether Into a 1 l. three necked creased flask is charged 608 g. of the light phase comprising polyphenylene ether and styrene monomer. The system is purged with nitrogen and a small nitrogen pressure is maintained throughout the polymerization. 6.0 g. of acetic anhydride is added as a capping agent; the reaction color turns light orange. The polymerization mixture is raised to 125° C. in 54 minutes and polymerization is continued for 120 minutes. Periodically, aliquots are withdrawn, weighted, methanol precipitated and dried. The % conversion to polymer is determined in a standard way. The weight average molecular weight (M.W.) is determined using a duPont high pressure L.C. and highest population technique. The polyphenylene ether/polystyrene composition is determined by infrared analysis and the percent styrene conversion per hour is calculated from the following formula:

$$\% \text{ styrene conversion} = \frac{\frac{\text{g polyphenylene ether (PPO)}}{\text{Polystyrene}}}{\text{g styrene}} \times 100$$

The grams of polyphenylene ether and the grams of styrene are determined from the initial reaction solids which at time zero is assumed to be 100% polyphenylene ether. The light extract solids content is 16%, initially. The styrene conversion rate (%/hr.) is obtained by plotting the % styrene conversion vs. time.

The compositions and conversion are set forth in Table 1.

TABLE 1

| | Styrene Polymerization in Presence of Polyphenylene Ether Composition | | |
|---|---|---|---|
| Time, min. | Polyphenylene Ether | Polystyrene | Conversion, % |
| 0 | 90 | 10 | 2.11 |
| 30 | 69 | 31 | 8.57 |
| 60 | 61 | 39 | 12.21 |
| 90 | 51 | 49 | 18.31 |
| 120 | 45 | 55 | 23.28 |

A conversion rate of 10.6%/hr. is recorded. The molecular weight of the final product is 245,000. This is significantly faster and higher molecular weight than when base extraction is omitted.

EXAMPLE 2

(a) Preparation of Liquid-Liquid Extracted Solution of Poly(2,6-Dimethyl-1,4-phenylene)ether This follows Example 1, step (a).

(b) Thermal Polymerization of Styrene Containing Poly(2,6-dimethyl-1,4-phenylene)ether The procedure of Example 1, step (b) is repeated, using 720 g. of the light phase, and omitting the capping agent, acetic anhydride, treatment. Polymerization temperature is reached in 64 minutes.

The composition and conversion are set forth in Table 2:

TABLE 2

| | Styrene Polymerization in Presence of Polyphenylene Ether | | |
|---|---|---|---|
| Time, min. | Polyphenylene ether | Polystyrene | Conversion, % |
| 0 | 92.5 | 7.5 | 1.54 |
| 30 | 74.5 | 25.5 | 6.52 |
| 60 | 62.5 | 37.5 | 11.40 |
| 90 | 56.5 | 43.5 | 14.66 |
| 101 | 53.5 | 46.5 | 16.55 |

The conversion rate is an acceptable 8.9%/hr. The molecular weight is 295,000. This example demonstrates that high molecular weights can be achieved without a capping agent.

EXAMPLE 3

(a) Preparation of Liquid-Liquid Extracted Solution of Poly(2,6-Dimethyl-1,4-phenylene)ether in Styrene This follows Examples 1, step (a).

(b) Thermal Polymerization of Styrene Containing Poly(2,6-Dimethyl-1,4-phenylene)ether The procedure of Example 1, step (b) is repeated, using 659.3 g. of the light phase and substituting 3.3 g. of glacial acetic acid for the acetic anhydride. Upon addition of the acetic acid the reaction solution color turns light yellow. Polymerization temperature is reached in 54 minutes.

The composition and conversion are set out in Table 3:

TABLE 3

| | Styrene Polymerization in Presence of Polyphenylene Ether Composition | | |
|---|---|---|---|
| Time, min. | Polyphenylene Ether | Polystyrene | Conversion, % |
| 0 | 91 | 9 | 1.88 |
| 30 | 87 | 13 | 2.84 |
| 60 | 63 | 37 | 11.18 |
| 90 | 55 | 45 | 15.58 |
| 120 | 50 | 50 | 19.0 |

The conversion rate is 9.3%/hr. The molecular weight is 295,000.

Comparison experiments show that, with acetic acid treated reaction mixture, the molecular weight of the polystyrene is only 140,000; the ratio at 92 minutes of polyphenylene ether to polystyrene is only 62/38; and a conversion rate of only 7.0%/hr. is observed.

EXAMPLES 4–7

Four pilot plant scale procedures are carried out by the general method of Example 1.

(a) Preparation of a Liquid-Liquid Extracted Solution of Poly(2,6-dimethyl-1,4-phenylene)ether in Styrene The reaction temperatures are 65° F. for 60 min.; 85° F. thereafter, for a total reaction time of 130 minutes. 85% of the 2,6-xylenol is added by programmed addition over 35 minutes. Amine promotors are used at 1.5 mole % of 2,6-xylenol. Catalyst ratio is 1200:1:2(2,6-xylenol/MnCl$_2$/benzoin oxime). Sodium hydroxide is used at 2 weight % of 2,6-xylenol (2,6-xylenol/NaOH=16:1). Aliquat 336 is present at 0.05% based on styrene monomer. In one case styrene is partially replaced with ethylbenzene. The compositions employed are set forth in Table 4.

TABLE 4

| | Polymerization of 2,6-Xylenol in Styrene | | | | |
|---|---|---|---|---|---|
| Example (parts by weight) | 2,6-xylenol | Styrene | Ethyl Benzene | Methanol | Amine(s) |
| 4 | 20 | 68 | — | 12 | diethylamine |
| 5 | 20 | 40 | 28 | 12 | di-n-butyl-amine |
| 6 | 20 | 68 | — | 12 | meta xylene diamine di-n-butyl-amine |
| 7 | 20 | 68 | — | 12 | di-n-butyl-amine |

Following dilution with 2 gal. of styrene, the batches are heated to 130°–140° F. After drawing off 2 gallons, the reaction mixture is extracted with 6 liters of water and separated in a Westphalia liquid-liquid centrifuge. About six gallons of centrifuge light phase is isolated per batch.

(b) Thermal polymerization of Styrene Containing Poly(2,6-dimethyl-1,4-phenylene)ether.

The centrifuge light phases from step (a) are polymerized directly in a 2 gallon Chemco reactor equipped with an internal steam and water coil, external electrical heaters, thermometer, nitrogen dip tube, agitator, and a reflux head with a Dean-Stark trap. Typically about six kilograms of the PPO/styrene feedstock of about 16 percent solids are charged into the reactor. The mixture is heated to 105° C. over 60–100 minutes using the internal steam coil. A brisk nitrogen purge is employed during this period and a small amount of methanol and water distills out during this preliminary warm-up stage.

A styrene polymerization temperature of 125° C. is employed in most of the reactions. No radical initiator is used or found necessary. A small amount of acetic acid or an anhydride (acetic or maleic) is added after the residual methanol/water is removed to improve final product color and neutralize any residual base.

Upon reaching 125° C. the styrene polymerization is complete within two hours and a resin masterbatch of approximately 50/50 PPO/polystyrene composition is obtained. For convenience the reaction mixture is diluted with toluene to quench the polymerization and permit easy handling.

The masterbatches are totally isolated by slurry granulation in the 10 gallon pilot plant crumber. The conditions used and the results obtained are set forth in Table 5:

TABLE 5

Polymerization of Styrene in the Presence of Polyphenylene Ether

| Example | Feed Stock (Example (step)) | Temp., °F. | Time, min. | Polyphenylene ether/polystyrene | Styrene Conversion %/hr. |
|---|---|---|---|---|---|
| 4A | 4(a) | 125 | 100 | 46/54 | 11.4 |
| 4B | 4(a) | 125 | 85 | — | 14.0 |
| 4C | 4(a) | 125 | 107 | 52/48 | 8.7 |
| 5A* | 5(a) | 125 | 165 | 60/40 | — |
| 5B* | 5(a) | 110 | 372 | 64/36 | — |
| 6A | 6(a) | 115–120 | 172 | 54/46 | 6.45 |
| 6B | 6(a) | 125 | 79 | 54/46 | — |
| 6C | 6(a) | 124 | 100 | 48/52 | — |
| 7A* | 7(a) | 125 | 105 | 55/45 | — |
| 7B* | 7(a) | 125 | 115 | 52/48 | — |
| 7C* | 7(a) | 105–111 | 340 | 54/46 | — |

*Acetic acid 0.2 wt. % of PPO; all others acetic anhydride, 0.3-4 wt. % of PPO.

The runs at 105° to 110° C. lower the styrene conversion rate. Otherwise, high yields of desired product are obtained efficiently by the process of this invention. They are convertible in conventional ways into useful molding compositions, e.g., by adding crystal polystyrene and block copolymers of the ABA type, e.g., Shell Chemical's Kraton K-1101.

The foregoing detailed description will suggest many variations to those skilled in this art. For example, the vinyl aromatic can be chemically coupled to the polyphenylene ether by providing vinyl functionality to the latter. A preferred way of so doing is to use an effective amount of a vinyl unsaturated coupling agent, functionally-reactive with polyphenylene ether, such as maleic anhydride, which forms an unsaturated ester functional group with the terminal —OH groups in the polyphenylene ether. This is quickly copolymerized with styrene through the double bond. Of course, other methods which provide for the addition of vinyl groups to the polyphenylene ether chain can also be used for the same purpose. All such obvious variations are within the full intended scope of the appended claims.

I claim:

1. A process for the preparation of a composition comprising a polyphenylene ether and a poly(vinyl aromatic) compound, said process comprising the steps of:

(a) oxidatively coupling a phenolic monomer to form a polyphenylene ether in a basic reaction medium comprising a polymerizable vinyl aromatic compound in the presence of a manganese chelate complex of the formula (L)$_x$Mn wherein L is a ligand derived from an ω-hydroxyoxime by conventional means, Mn is the transition metal manganese and x is at least equal to about 0.05;

(b) selectively liquid-liquid extracting from the reaction mixture of step (a) with an immiscible solvent to the base-reactive by-products therein; and (c) thereafter heating the base-extracted solution of polyphenylene ether in vinyl aromatic compound under polymerization conditions until at least part of said vinyl aromatic compound has been polymerized.

2. A process as defined in claim 1 wherein the phenolic monomer is selected from compounds having the formula:

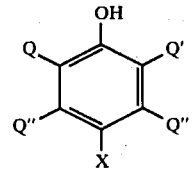

wherein X is a substituent selected from the group consisting of hydrogen, chlorine, bromine and iodine, Q is a monovalent substituent selected from the group consisting of hydrocarbon radicals, halohydrocarbon radicals having at least two carbon atoms between the halogen atom and the phenol nucleus, hydrocarbonoxy and halohydrocarbonoxy radicals having at least two carbon atoms between the halogen atom and the phenol nucleus; and Q' is as defined for Q, and in addition may be halogen and Q" are each as defined in Q' and in addition hydrogen, with the proviso that Q, Q' and Q" are all free of a tertiary carbon atom.

3. A process as defined in claim 2 wherein the phenolic compound is 2,6-xylenol.

4. A process as defined in claim 1 wherein the vinyl aromatic compound is styrene or vinyl toluene.

5. A process as defined in claim 4 wherein the vinyl aromatic compound is styrene.

6. A process as defined in claim 1 wherein the ligand of the manganese chelate complex is of the formula:

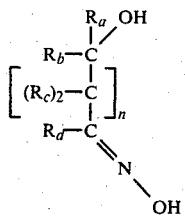

wherein $R_a$, $R_b$, $R_c$, $R_d$ are selected from the group consisting of hydrogen, acyclic and cyclic organic radicals and n is a positive integer equal to 0 or 1.

7. A process as defined in claim 6 wherein the manganese chelate complex is manganese benzoin oxime.

8. A process as defined in claim 1 wherein said base is an alkali metal hydroxide in a solvent comprising water.

9. A process as defined in claim 8 wherein said solvent further includes a low molecular weight alcohol.

10. A process as defined in claim 1 which includes the step of adding an acid, acid halide or acid anhydride to neutralize any trace base after step (b), but prior to step (c).

11. A process as defined in claim 1 which includes the step of employing a vinyl unsaturated coupling agent functionally reactive with the polyphenylene ether, by means of which the vinyl aromatic compound is chemically graft copolymerized onto the polyphenylene ether in step (c).

12. A process as defined in claim 11 wherein said coupling agent is maleic anhydride.

* * * * *